UNITED STATES PATENT OFFICE.

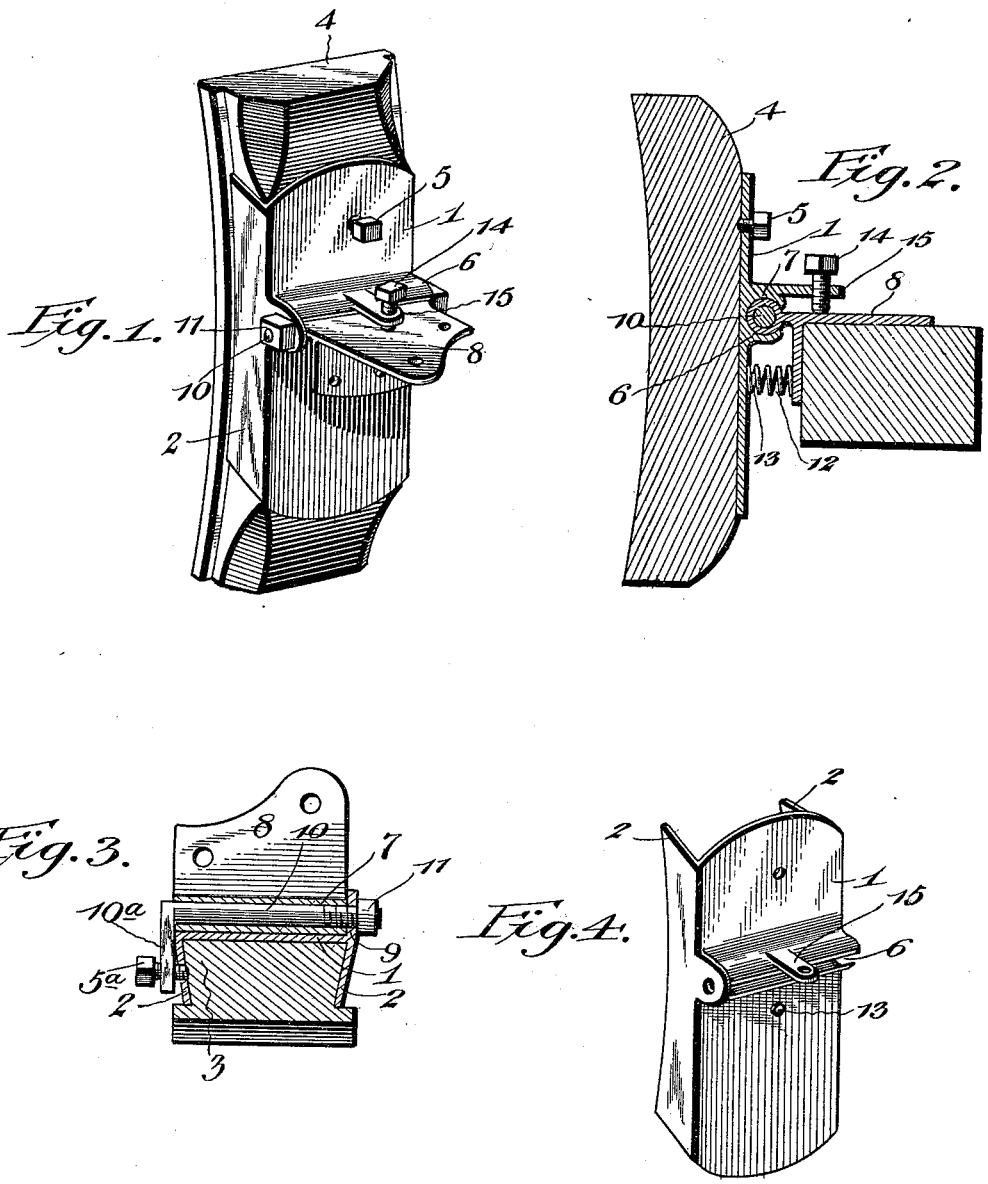

ANDREW H. PETERSON, OF SAN SIMEON, CALIFORNIA.

SPRING BRAKE-SHOE.

SPECIFICATION forming part of Letters Patent No. 634,182, dated October 3, 1899.

Application filed September 20, 1898. Serial No. 691,446. (No model.)

*To all whom it may concern:*

Be it known that I, ANDREW H. PETERSON, a citizen of the United States, residing at San Simeon, in the county of San Luis Obispo and State of California, have invented a new and useful Spring Brake-Shoe, of which the following is a specification.

The invention relates to improvements in brake-shoes.

The object of the present invention is to improve the construction of brake-shoes and to provide a simple and comparatively inexpensive one which is adapted to engage a wheel yieldingly when it is first applied and which is capable of firmly locking the same when it is fully applied.

A further object of the invention is to provide a brake-shoe which when the brake mechanism is operated to relieve the wheels will be instantly thrown off the same; and another object of the invention is to enable the movement of the brake-shoe independent of the brake-beam to be readily regulated.

The invention consists in the construction and novel combination and arrangement of parts, as hereinafter fully described, illustrated in the accompanying drawings, and pointed out in the claims hereto appended.

In the drawings, Figure 1 is a perspective view of a brake-shoe constructed in accordance with this invention. Fig. 2 is a vertical sectional view of the same. Fig. 3 is a horizontal sectional view. Fig. 4 is a detail perspective view of the frame or casing.

Like numerals of reference designate corresponding parts in all the figures of the drawings.

1 designates a frame or casing constructed of metal and provided with converging side flanges 2, adapted to engage and receive between them a dovetailed portion 3 or a brake-block 4, which is provided at opposite sides with grooves or recesses to form the said dovetailed portion 3, and the engaging face of the brake-block is slightly curved to conform to the configuration of the wheel. The brake-block, which may be constructed of any suitable material, is secured within the frame or casing 1 by means of a suitable fastening device 5 passing through the upper portion of the latter and engaging the block. By this construction the brake-block may be held at any desired adjustment.

The frame or casing is provided at its back with a transverse socket 6, of substantially cylindrical shape, and the said socket, which is provided with a transverse opening, receives an eye 7 of a bracket or plate 8. The eye is cylindrical to fit the socket, and the plate or bracket is L-shaped, the eye being connected with the same at the angle thereof, and the opening of the socket permits a limited swing of the frame or casing on the bracket or plate. One end of the socket is provided with a reduced opening 9, of less diameter than the eye 7, and the parts are connected by a transverse bolt 10 passing through the eye and having a threaded end extending through and beyond the reduced opening 9 and engaged by a nut 11. The nut 11 is located at one side of the brake-block, and the transverse bolt 10, which is L-shaped, has its arm $10^a$ located at the other side of the brake-block, as clearly shown in Fig. 3 of the accompanying drawings. The arm $10^a$, which is arranged on the adjacent side of the casing, is provided at its outer end with a threaded opening receiving a screw $5^a$, which passes through the casing and engages the brake-block to assist in retaining the same in the casing. The L-shaped plate, which is adapted to fit against the rear edge of the brake-beam, extends over the top and rear edge of the same and is suitably secured to the beam by bolts or other fastening devices.

The hinge-joint, which connects the bracket or plate with the frame or casing, is located at a point above the center of the brake-block, and in order to cushion the brake-shoe a coiled spring is interposed between the depending portion of the bracket and the frame or casing. This coiled spring 12, which may be mounted in any suitable manner, is preferably secured to the frame or casing by a suitable fastening device 13, arranged within the coils of the spring. When the brake-shoe first comes in contact with a wheel, the pressure is resisted by the coiled spring 12; but as the application of the brake increases the limit of movement of the frame or casing on the bracket is reached and the brake-shoe engages the wheel solidly. When the brake-shoe is applied, the spring 12 is compressed, and it serves to throw the upper portion of the brake-shoe away from the wheel as soon as the brake mechanism is operated to relieve the wheels. The hinge movement of the parts is further limited by an adjusting-screw 14, mounted in a threaded perforation of an arm 15, which extends from the frame or casing, projecting over the plate or bracket which the adjusting-screw is adapted to engage. By adjusting the screw vertically the desired movement of the brake-shoe may be obtained.

Changes in the form, proportion, and minor details of construction may be resorted to without departing from the spirit or sacrificing any of the advantages of this invention.

What is claimed is—

1. The combination with a brake beam or bar, of a brake-shoe hingedly connected with the same, a spring located at one side of the hinge-point and interposed between the brake-shoe and the beam, and an adjusting device located at the opposite side of the hinge-point and arranged to limit the swing of the brake-shoe, substantially as described.

2. In a device of the class described, the combination with a bracket designed to be mounted on a brake bar or beam, of a brake-shoe hinged to the bracket, a spring engaging the lower portion of the brake-shoe, an arm carried by the upper portion of the brake-shoe and extending over the bracket, and an adjusting-screw mounted on the arm and engaging the bracket, substantially as described.

3. A device of the class described comprising an L-shaped plate or bracket, a brake-block hinged to the plate or bracket at the angle thereof, a coiled spring interposed between the lower portion of the brake-block and the depending portion of the plate or bracket, an arm extending from the brake-block and located above the plate or bracket, and an adjusting-screw mounted on the arm and arranged to engage the said plate or bracket to limit the movement of the brake-block, substantially as described.

4. A device of the class described comprising a casing provided at its back with a transverse socket, a bracket or plate provided with an eye arranged in said opening, an L-shaped bolt passing through the eye and securing the same in the socket and having its arm arranged at one side of the casing, and a clamping-screw mounted on the arm of the bolt and extending through the casing and adapted to engage a brake shoe or block, substantially as described.

5. A device of the class described comprising a brake-beam, a brake-shoe hinged to the brake-beam at the upper face thereof, means for cushioning the brake-shoe, and an adjusting-screw mounted on one of the parts and arranged to abut against the other part, whereby the movement of the brake-shoe is limited, substantially as described.

In testimony that I claim the foregoing as my own I have hereto affixed my signature in the presence of two witnesses.

ANDREW H. PETERSON.

Witnesses:
PHIL KAETZEL,
C. C. POTTER.